Patented May 16, 1950

2,507,665

UNITED STATES PATENT OFFICE 2,507,665

PROTECTIVE COATING COMPOSITIONS

Stoddard I. Ford, Pomona, Calif., assignor, by mesne assignments, to Brogdex Company, Pomona, Calif., a corporation No Drawing. Application October 30, 1947, Serial No. 783,213

4 Claims. (Cl. 260—33.6)

This invention relates to protective coating compositions; and it relates more particularly to novel compositions which are suitable for protectively coating metallic and other surfaces and which comprise essentially a hard, relatively high-melting synthetic resin of the phenolic type and a styrene resin of similarly high or even higher melting point, in mixture with a terpene resin that is also hard and high melting; the mixture being dissolved in a readily volatilizable composite or mixed solvent vehicle comprising both aliphatic and aromatic hydrocarbons.

In the protective coating of surfaces generally, and particularly in the field of coating metallic surfaces for protection against deterioration due to corrosion or rusting, a vast amount of effort has been expended over a great many years in the search for coating compositions which not only will afford protection for the given surface in maximum or desired degree but also will be commercially practicable to employ because sufficiently low in cost and easy to apply. Of the many coating compositions heretofore proposed for the general purposes indicated, some have proved sufficiently satisfactory for practical use; but it is well known that in coating compositions intended for the protective coating of metal surfaces especially, there still remains much room for practical improvement. It is to such improvement that the present invention is directed.

Among the characteristics recognized as highly desirable in a composition for protectively coating sheet metal, for example, are that the protective film left after the composition has been applied and the volatile solvent or thinner has evaporated shall dry hard in a short time and not be tacky, shall adhere tenaciously to the supporting base, and shall be tough, pliable and markedly resistant to oxidation, salt sprays and heat. The novel coating compositions of the present invention possess not only all these characteristics in unusually high degree but, in addition, other characteristics which, in conjunction with those first mentioned, render said compositions outstandingly effective and valuable for many purposes, including the protective coating of metal surfaces.

As has already been indicated hereinabove, the base of the present novel coating compositions is essentially a mixture of three distinct types of synthetic or artificially produced resin components, namely, the phenolic type, the polymerized styrene type, and the polymerized terpene type, the proportion of the phenolic type component exceeding that of either of the other two, although those other two, together, constitute a large part of the mixture, most desirably about one-half thereof. It has been found that employment of these three types of resins in combination to constitute substantially the entire solid portion or film-forming base of said compositions is essential to accomplishment of the objects of the invention. The presence in the compositions of even relatively small proportions of wax or wax-like material (e. g. paraffin), or of non-volatile oily or fatty matter, has been found objectionable because of the definitely detrimental effect which inclusion of such material has upon the quality of the eventual protective film coating. Hence, in the practice of the invention, such materials are substantially excluded from the new coating compositions.

The phenolic resin component, which should be hard and relatively high-melting, is most desirably what is known as a "100% phenolic resin"; that is, it is a resin, not oil or otherwise modified, obtainable in generally well known manner by catalytic reaction between a phenol, more especially a substituted monohydric phenol, and formaldehyde. Numerous phenolic resins of this general description that are high-melting and otherwise suitable for the purposes of the invention are commercially available. One which has given especially excellent results in practice is supplied by Bakelite Corporation, New York, under the designation "Bakelite Resinoid 3360" or, more briefly, "BR-3360". This is a hard resin, usually light brown in color, only slightly soluble in the common aliphatic hydrocarbon solvents but freely soluble in aromatic solvents such as benzol and its homologs. Produced by catalytic reaction between a substituted monohydric phenol and formaldehyde, BR-3360 is a 100% phenolic which, although 100% oil-soluble, is distinguished from many other oil-soluble phenolic resins by being of the heat-hardening type; that is, it will polymerize when subjected to continued heating at hardening temperatures. Preparation of resins of this type has been described by Turkington and Allen in Industrial and Engineering Chemistry, vol. 33, page 966, August 1941. The manufacturer's specifications for BR-3360 call for a melting point of from 175° to 205° F., and require that when it is dissolved 1:1 in xylol, it shall have a color rating of 1–7 by the Gardner-Holt scale.

The styrene resin component, which should also be hard and high-melting, may be any of various products obtainable by subjecting styrene or a styrene homolog, or mixtures of these, accompanied or not by other polymerizable compounds such as indene, to polymerizing conditions in generally well known manner. Certain commercially available products eminently suited to serve as the styrene resin component of a coating composition of the present invention are prepared by polymerizing treatment of raw materials of the general character described in the patent to Soday 2,230,274. Particularly desirable among these, is an impure styrene resin marketed under the designation "480 Oil Proof Resin" by Pennsylvania Industrial Chemical Corporation, Clairton, Pennsylvania, and produced by catalytic polymerization of a crude styrene fraction. It is predominantly a medium-molecular-weight polymer of a methylstyrene-styrene-indene fraction produced by catalytically cracking petroleum. It has an extremely high-melting point, and is soluble in aromatic solvents but substantially insoluble in aliphatic hydrocarbon solvents.

Terpene resins suitable to provide the third resin component of the new coating compositions may be described generally as polymers of unsaturated terpenes such, for example, as are present in turpentine. Especially suitable are resins composed essentially of polymers of selected, unsaturated terpadienes. The most desirable of these resins exhibit excellent thermoplasticity, are substantially neutral (acid number approximately zero), unsaponifiable (saponification number approximately zero), inert to dilute acids and alkalies and highly resistant to oxidation, have a wide range of solubility in aliphatic hydrocarbon solvents (e. g. petroleum naphthas and thinners) as well as aromatic hydrocarbon solvents (e. g. coal tar solvents), and are relatively hard, with melting points ranging from 90° to 125° C. (ball and ring softening point method). Clear, hard resins of this type, resulting from the polymerization of terpene starting material consisting preponderantly of beta-pinene, are produced and distributed by Pennsylvania Industrial Chemical Corporation under the name "Piccolyte" resins. One of these, designated "Piccolyte S-115" and having a melting point of 115° C., has been found particularly desirable to employ as the terpene resin component of the new protective coating compositions. This and similar terpene resins, as well as a method of producing them, are disclosed in the patent to Burroughs 2,335,912.

As solvent for the resin components aforesaid, a mixture of easily volatilizable aliphatic and aromatic hydrocarbons is employed in which the resins are completely soluble, the proportion of solvent in the complete coating composition being sufficiently large to ensure maintaining the entire resin content in solution at ordinary shipping and storage temperatures. The aliphatic hydrocarbon solvent may be, typically, petroleum spirits, petroleum thinner, or the like; while the aromatic solvent may be any of the usual coal-tar type of solvents and thinners. Although the proportions may be varied within reasonable limits, the aromatic solvent should ordinarily constitute at least 40 per cent of the mixed solvent. A solvent produced by Shell Oil Company and available under the name "TS-11" has proved highly satisfactory. In composition, it is equivalent to a mixture of 44 per cent of an aromatic solvent with 56 per cent of an aliphatic hydrocarbon (e. g. petroleum) solvent. It dissolves the resins completely, is not disagreeable to use, evaporates fast and clean, and is relatively inexpensive.

In order to afford a fuller understanding of the invention, a specific example illustrating a typical embodiment thereof will now be described in detail. In this example, the resin and solvent components employed are those which have been hereinabove indicated as especially advantageous for the purposes of the invention, but this is not to be construed as in any sense limiting the invention to those specific components. In this specific example the formula for the protective coating composition, in parts by weight, is as follows:

| | Parts |
|---|---|
| Phenolic resin—Bakelite resinoid 3360 | 10 |
| Styrene resin—480 Oil proof resin | 6 |
| Terpene resin—Piccolyte S-115 | 4 |
| Mixed solvent—TS-11 | 80 |

This makes a stock solution which is most desirably diluted, 1 part of stock to 3 parts of solvent, for application to the surface to be protectively coated.

While preparation of the stock solution can be accomplished in various ways, the following procedure has been found to have certain practical advantages when employing the specific materials given in the above formula, and is accordingly recommended:

4 parts of the terpene resin are placed in a steam-jacketed kettle equipped with a slow speed agitator. When the resin is melted the agitator is started and 10 parts of the phenolic resin are added. When this also has melted, 6 parts of the styrene resin are added, agitation being continued until the melting of the resins is complete and the melt is homogeneous. The heat on the kettle then is turned off and the temperature allowed to drop until the melt becomes just slightly viscous. About 20 parts of solvent are then run in and, as the agitation continues, the remaining 60 parts are thereafter run in slowly. When the resin mixture is fully dissolved, the resultant solution is cooled, filtered through a varnish filter and placed in suitable containers.

Instead of making a 20 per cent solution of the resins as in the above specific example, it is entirely feasible to prepare solutions of widely different concentrations ranging from 1 per cent to 50 per cent. Ordinarily a resin content of from 2.5 to 5 per cent is to be recommended as most suitable to employ in apply the coating composition to the surface to be protected. The color of the coating material, as prepared, varies from an amber color to a dark brown depending on the percentage of resins present.

The protective film left after application of the coating composition and evaporation of the solvent is transparent, hard, smooth and lustrous, and is not easily scratched or injured. The film dries hard and non-tacky in a short time, and is characterized by excellent adhesion to the article coated, working equally well on bare metal surfaces or on primed or painted surfaces. It is also very resistant to oxidation, salt solutions and heat. On bare metal, the coating may be subjected to at least 600° F. without charring, although it may become fluid. Upon cooling, the film so heated remains unimpaired. Another valuable characteristic of the coating is its remarkable toughness and pliability. Thus, sheet metal to which the coating has been applied, can be bent on a metal brake through an angle of 135 degrees without impairing the coating or its resistance to salt water.

The novel coating compositions can be very easily applied to the articles to be coated in many various ways. Thus, the articles may be dipped, drained and air dried or heat dried; brushed and air or heat dried; or sprayed with an air brush and air or heat dried. Drying in air is a matter of a very few minutes and this drying can be further speeded up by use of infra-red lamps or a heat tunnel.

The new protective coating compositions are of utility in many different fields. Fly screens of either copper or iron may be sprayed with them to prevent rusting or corrosion over a long period of time. Sheet steel exposed to weather is rendered highly resistant to rusting when coated with a coating composition of the invention. Other uses are in coating turned or polished parts from lathe or precision grinders to prevent rusting prior to final assembly, and tools and machine parts generally may be effectively protected against rust in the same manner. The transparency of the protective coating makes it also particularly well adapted for protecting projectiles, such as naval torpedoes, which have to be inspected frequently to detect even the most minute rust spots. Most paint and lacquer coatings heretofore employed in this connection have to be removed to permit such inspection. The light weight and extreme smoothness of the protective film coating resulting from use of the novel coating compositions renders them of value in lessening air drag on aeroplanes, as well as in sealing the riveted joints and preventing the formation of an oxide film on the exposed metal surface. These are only typical of many possible uses for the novel compositions of the present invention.

It is obvious that suitable colors or pigments may be incorporated in the novel coating compositions, if desired, and such additions are to be understood as within the scope of the invention as defined by the appended claims.

What is claimed is:

1. A protective coating composition having a film-forming synthetic resin base which consists substantially of a mixture of an oil soluble, heat-hardening phenol-formaldehyde resin with polymerized styrene and terpene resins in respectively smaller proportions but, together, constituting a large part of the mixture, said mixture being dissolved in a readily volatilizable mixed solvent comprising both aliphatic and aromatic hydrocarbon solvents, all said resins being hard and relatively high-melting, and said composition being substantially free of wax-like material and non-volatile oily matter.

2. A protective coating composition as defined in claim 1, wherein the styrene resin component is predominantly a medium-molecular-weight polymer of a methylstyrene-styrene-indene fraction produced by catalytically cracking petroleum.

3. A protective coating composition as defined in claim 2, wherein the terpene resin component consists preponderantly of polymerized beta-pinene.

4. A protective coating composition as defined in claim 1, wherein said resin base consists substantially of an oil-soluble, heat-hardening, 100% phenolic resin resulting from catalytic reaction between a substituted monohydric phenol and formaldehyde, a styrene resin resulting from catalytic polymerization of a crude styrene fraction, and a thermoplastic terpene resin resulting from catalytic polymerization of material having a terpene content consisting preponderantly of beta-pinene.

STODDARD I. FORD.

REFERENCES CITED

The following references are of record in the file of this patent:

UNITED STATES PATENTS

| Number | Name | Date |
|---|---|---|
| 2,163,637 | Thomas | June 27, 1939 |

FOREIGN PATENTS

| Number | Country | Date |
|---|---|---|
| 549,303 | Great Britain | Nov. 16, 1942 |